Patented June 20, 1944

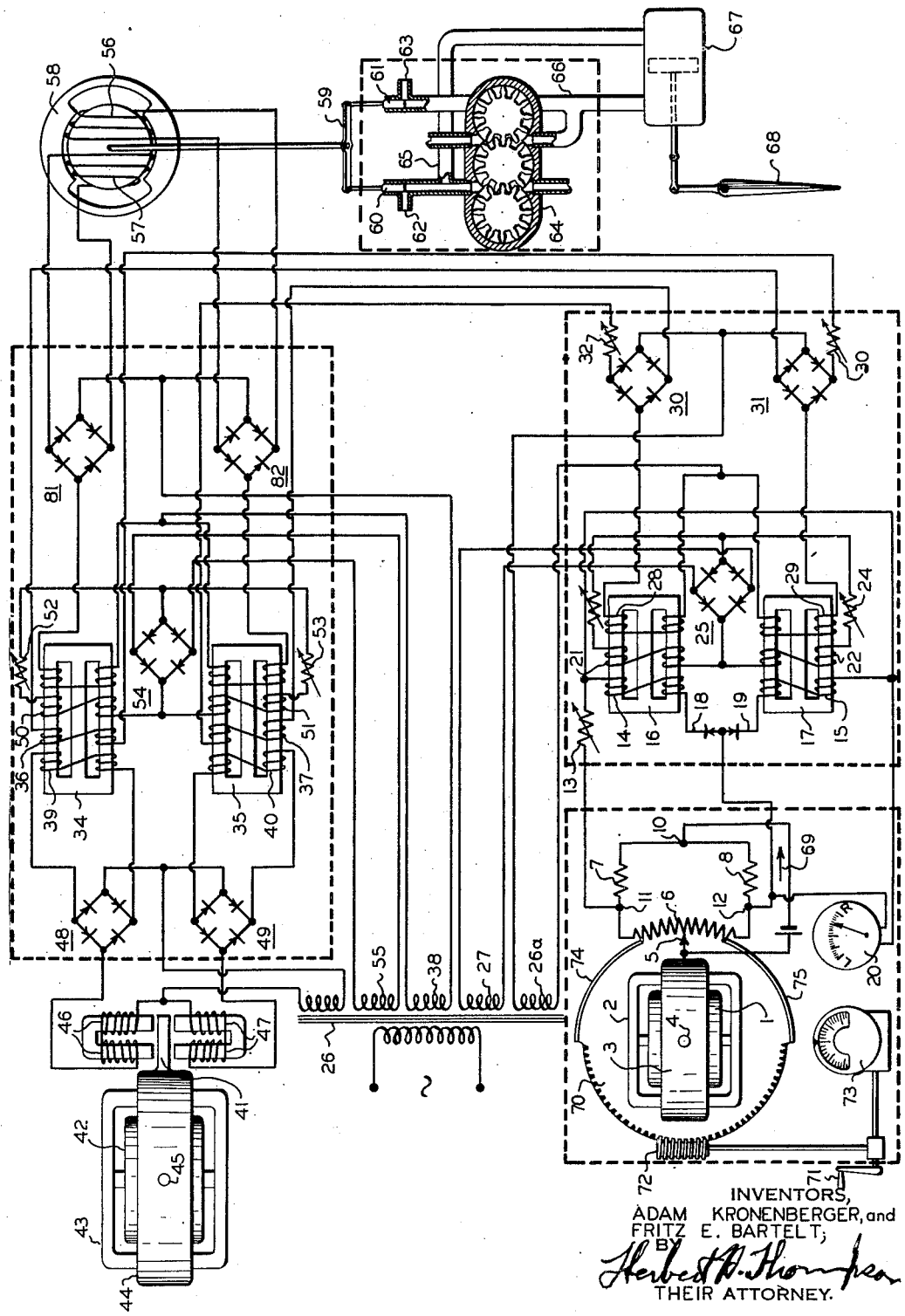

2,351,977

UNITED STATES PATENT OFFICE 2,351,977

AUTOMATIC AIRCRAFT STEERING DEVICE

Adam Kronenberger and Fritz E. Bartelt, Berlin, Germany; vested in the Alien Property Custodian Application April 17, 1941, Serial No. 388,980
In Germany October 27, 1939

6 Claims. (Cl. 172—282)

This invention relates to an automatic aircraft steering device controlled by electrically transmitted steering impulses. Generally, with such arrangements, gyroscopic devices are used as steering impulse generators for preventing deviation of the aircraft from its correct attitude. Besides the impulses caused by change of attitude or position, other steering impulses are used depending upon the angular velocity and sometimes also upon the angular accelerations of the craft. In order to obtain most favorable steering action, the impulses have to be correctly balanced in magnitude. In particular, it is necessary that the impulse actually controlling the course must not exceed certain limits. On the other hand, it is also desirable to employ this steering impulse for controlling an indicator. For the purpose of steering, the full range of deflection must be limited to a relatively small angle, whereas the range of the course indicator must comprise a considerably larger angular range up to 10° or even 30°. Both requirements are fulfilled according to the present invention by inserting saturable reactor system between the electric steering impulse generator and the power relay which operates the aircraft control surface or surfaces. The saturable reactor system is designed as an amplifying choke and so biased magnetically that the portion of the steering impulse to be used for controlling the course is reduced to the desired limit due to saturation of the magnetic system. Thus, the steering impulse actually transmitted to the power relay is reduced to the magnitude required for automatic steering and only a predetermined maximum value can be effective for changing the course in response to changes in the base line. At the same time, a counter impulse, controlled by the angular velocity of the craft, is employed for opposing the normal steering impulse.

In general, both positive and negative steering values are transmitted. This can be accomplished by using two choke systems, one of which transmits positive values, while the other transmits negative values. The power relay may then be designed as a device which responds to the differences or the ratios of the impulses. For example, a moving coil instrument with two opposed windings may be used.

In order to superimpose upon the course steering impulses the signals obtained from the angular velocity and the angular acceleration, it is proposed to use an amplifying choke provided with a plurality of control windings which receive the different signals, the output of said amplifying choke being proportional to the sum of all the impulses.

The drawing shows an automatic course steering device designed according to the invention.

Reference numeral 1 shows schematically a rotor of a directional gyro which spins around a horizontal axis in the rotor bearing frame 2. The rotor bearing frame is pivoted around another horizontal axis in the gimbal frame 3. On the frame 3, which can oscillate around a vertical axis 4, a sliding contact 5 is mounted which glides over the winding of a potentiometer 6. This potentiometer forms one branch of a Wheatstone bridge, the other branch of which is formed by two equal fixed resistors 7 and 8. Direct current is supplied to the bridge by a battery 9 to the points 5 and 10, causing a differential potential between points 11 and 12 as soon as contact 5 moves away from its mean position. Depending upon the direction of the current, which in turn depends upon the sign of the course deviation of the aircraft, the current which is adjusted by a rheostat 13, flows through one or the other of the control windings 14 and 15 of two amplifying chokes 16 and 17 through the associated rectifiers 18 or 19. A moving coil indicator 20 is also connected across the bridge, serving as a course indicator for the gyro. The chokes 16 and 17 have two bias windings 21 and 22 which are connected through adjustable rheostats 23 and 24 and a full-wave rectifier 25 to the winding 27 of a transformer 26 supplied with 500 cycle A. C. The full output of the chokes 16 and 17 is obtained more quickly as the bias magnetization is raised. Preferably the control range is limited to about 2° off course change while the range of the potentiometer 5 and 6 extends over more than 20°, thereby supplying a proportionally higher current to the course indicator 20, giving an indication of the total course deviation.

On its output side, the amplifying system 16 and 17 is connected to another similar amplifying choke system 34 and 35 by having its windings 28 and 29 connected through rectifiers 30 and 31 and rheostats 32 and 33 to the windings 36 and 37. The first system obtains its supply from a winding 26a of transformer 26 while the second system is supplied by a winding 38.

Besides the control windings 36 and 37, the chokes 34 and 35 have two additional control windings 39 and 40. The current flowing through these windings depends upon the position of an armature 41 which is controlled by a restrained gyro 42. This gyro is mounted in a bearing frame 43, which in turn is carried by a gimbal frame 44. Both the rotor bearing frame and the gimbal frame are restrained to their mean position in the usual way, not shown in the drawing. The rotor bearing frame has a weak restraining force while the gimbal frame is strongly restrained, so that only small deviations around the vertical axis 45 of the gimbal frame can be obtained. Such a gyro gives a steering impulse which is equal to the sum of the angular velocity and the angular acceleration of the aircraft. Depending upon the position of the armature 41 between the two coils 46 and 47, their magnetic resistance and thereby their self-induction is changed. Accordingly, the potential supplied from the transformer windings 38 encounters different resistances, so that in the windings 39 and 40 of the chokes 34 and 35, currents of different magnitude flow, passing through the rectifiers 48 and 49. By using the bias windings 50 and 51 which are also provided for this amplifying system and which are adjustable by means of rheostats 52 and 53, and a full wave rectifier 54 supplied by a winding 55 of transformer 26, it is possible to adjust the most efficient working point on the characteristic of the amplifier.

The steering impulses obtained from gyro 42 and from gyro 1 are super-imposed and commonly amplified in the chokes 34 and 35, and then introduced into the windings 56 and 57 of a direction sensitive torque motor 58 through respective rectifiers 81, 82. This torque motor controls the seesaw lever 59 of a hydraulic rudder motor system. Two small pistons 60 and 61 are attached to the seesaw and are adapted to alternately increase or decrease the cross section of ports 62 and 63 which are supplied with circulating pressure oil from an electrically driven three-wheel oil pump 64. As soon as the seesaw inclines to one side, one part will be throttled so that a higher pressure appears in the associated control pipe 65 or 66 respectively, whereby the work piston 67 is set in motion to cause an angular movement of the rudder 68.

The action of the steering device is as follows: while flying straight the windings 14 and 15 of the chokes 16 and 17 carry no current. The idle current coming from the coils 28 and 29 is carried through windings 36 and 37 to the two amplifying chokes 34 and 35 and is super-imposed upon the current flowing through the windings 39 and 40. Both currents are equal and opposite as the contact 5 and armature 41 are in their mean position, thereby neutralizing each other. The rheostats 52 and 53 in the bias circuit are so adjusted that the chokes 34 and 35 are approximately 50% saturated when everything is in neutral. The currents issuing from the two branches of the amplifier into the windings 56 and 57 of the torque motor 58 are without effect as long as contact 5 and armature 41 remain in their mean positions. The ports 62 and 63 therefore allow equal amounts of oil to pass and no differential pressure is acting upon the piston 67 and rudder 68 respectively.

If the aircraft is thrown off course by wind, gyro 42 precesses according to the angular velocity and angular acceleration of the craft. Furthermore, a relative motion occurs between the potentiometer contact 5 of the gyro 1 and the resistance element 6 proportional to the course deviation.

The arrow 69 may show the direction of the current flowing from battery 9 and may also show the direction of flight. Furthermore, is assumed that the aircraft is thrown off course to the right. The relative motion of the directional gyro therefore is towards the left. Also gyro 42, which may be considered as a mass of high inertia, lags behind the aircraft in the same sense. The contact 5, which is controlled by gyro 1, is displaced towards the top so that the resistance in the lower branch of the bridge increases. This increases the potential at the point 12 and current starts to flow from 1 through the rectifier 18 and the winding 14 of the choke 16, and from there through resistance 13 to point 11 of the bridge. This increases the output current of choke 16 whereby the current through the winding 37 of the choke 35 is increased while the current flowing through winding 36 of choke 34 remains unchanged. On the other hand, the movement of armature 4 of gyro 42 in counter-clockwise direction causes a decrease of magnetic flux in winding 47 so that the inductive resistance of this winding decreases and a higher current is flowing through the control winding 40 of choke 35 in the same sense as the current caused by gyro 1 through winding 37. As the motion of armature 41 simultaneously causes an increase of the inductive resistance of winding 46 the current flowing through control winding 39 of choke 34 decreases. The output current of choke 34 thus decreases while the current supplied to choke 35 increases in accordance with deviation, angular velocity and angular acceleration of the aircraft. The current in coil 57 of the torque magnet 58 therefore is higher than the one in 56 thereby causing a corresponding motion of the seesaw 59 in counter-clockwise direction. This tends to close port 62 and to increase pressure in pipe 65, forcing the work piston 67 to move downward. This in turn causes a deviation of the rudder to the left whereby the aircraft is returned to its original course. In order to be able to cause a change of course, the course base of the course gyro is adjustable in known manner. The resistance element 6 is mounted on a gear sector 70 which by means of a handwheel 71 and a worm 72 can be turned around the same axis 4 as the gimbal frame of gyro 1. Coupled to this gear drive is a course dial 73. The two ends of the resistance element 6 are connected to contact segments 74 and 75 in order to prevent interruption of contact even if handwheel 71 is turned very fast.

If it is intended to change course 30° to the left, the gear sector 70 is turned through 30° in right hand sense by means of handwheel 71 and the new course is indicated on dial 73. The aircraft now turns towards the left in order to re-establish the original mean position of contact 5 on the resistance element 6. The angular velocity obtained depends upon the magnitude of the course impulse with respect to the angular velocity impulse obtained from gyro 42 which opposes the turning motion of the aircraft. While the change of the base line may be accomplished in a few seconds, the aircraft needs 15 seconds if the adjusted angular velocity is 2° per second. This results in a course impulse which, for a considerable time, is far greater than the value necessary to maintain the aircraft on its course during straight flight, and which would not be able to hold its own against the angular velocity impulse if both were introduced into the chokes 34 and 35 in parallel. The chokes 16 and 17, which, according to the invention, are introduced into the course impulse circuit, limit the amount of the course impulse by cutting off the peak of the steering impulse. This is accomplished by obtaining saturation long before the maximum steering impulse has been reached. The indicator 20, however, receives the full value steering impulse so that, especially when steering by hand, the amount of deviation of the aircraft from the desired course can be read over a relatively wide angular range.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention, what we claim and desire to secure by Letters Patent is:

1. In an automatic steering device for aircraft, a direction responsive device, an electric pick-off operated thereby to produce an electrical control signal corresponding to deviation of said craft from a predetermined heading, means including a relay free to move according to the signal received from said pick-off for restoring said craft to said heading, and a saturable reactor interposed between said relay and said pick-off comprising an amplifying choke biased magnetically to limit said control signal to a predetermined magnitude before transmission thereof to said relay, whereby the maximum rate of response of said restoring means is limited.

2. In an automatic steering device for aircraft, a direction responsive device, a pick-off operated thereby to produce positive or negative control signals corresponding to deviation of said craft from a predetermined heading, means including a relay free to move according to the signal received from said pick-off for restoring said craft to said heading, and a saturable reactor interposed between said relay and said pick-off and comprising a pair of amplifying chokes one of which transmits positive control signals and the other of which transmits negative control system, both of said chokes being biased magnetically to limit said control signals to a predetermined magnitude before transmission thereof to said relay, whereby the maximum rate of response of said restoring means is limited.

3. An automatic steering device for aircraft comprising a direction responsive device, a pick-off controlled thereby for producing signals corresponding to deviation of said craft from a predetermined heading, an electromagnetic system connected with said pick-off and adapted to limit said signals to a predetermined magnitude, a rate of turn device, a pick-off associated therewith for producing signals corresponding to the rate of turn of said craft, a second electromagnetic system responsive to control signals from said rate of turn device, means for superimposing on said second electromagnetic system the control signals passing through said first electromagnetic system, and means including a power relay responsive to the combined signal for controlling the craft.

4. An automatic steering device for aircraft, comprising a direction responsive device, a pick-off operated thereby for producing a signal corresponding to deviation of said craft from a predetermined heading, an angular rate device, a second pick-off operated by said rate device for producing a signal corresponding to the rate of turn of said craft, means including a saturable magnetic device for amplifying and limiting said deviation signal, a further saturable magnetic device for combining said rate signal and said amplified deviation signal, and means including a power relay for controlling the craft in accordance with said combined signals.

5. An automatic steering device for aircraft as claimed in claim 4, further including indicator means responsive to said unlimited signal for indicating deviation of said craft from said heading.

6. An automatic control device for aircraft comprising means for producing electrical signals proportional to deviation of said craft from a predetermined attitude, means for limiting said signals to a predetermined magnitude, means for producing electrical signals proportional to the rate of deviation of said craft from said attitude, means for combining said limited signals with said rate signals, and means responsive to the combined signal for controlling said craft, whereby for sharp, sudden changes of attitude, said rate signals are predominantly controlling to prevent oscillating of said craft, and for slow, steady attitude changes said deviation signals predominate.

ADAM KRONENBERGER.
FRITZ E. BARTELT.